(12) United States Patent
Bonitz et al.

(10) Patent No.: US 7,139,133 B2
(45) Date of Patent: Nov. 21, 2006

(54) OPTICAL LENS SOFT-FOCUS EFFECT

(75) Inventors: Ralf Bonitz, Elsheim (DE); Ralf Biertuempel, Mainz (DE); Wolfgang Semar, Mainz (DE); Matthias Redey, Spiesheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/517,418

(22) PCT Filed: May 6, 2003

(86) PCT No.: PCT/EP03/04718

§ 371 (c)(1),
(2), (4) Date: Dec. 8, 2004

(87) PCT Pub. No.: WO03/107063

PCT Pub. Date: Dec. 24, 2003

(65) Prior Publication Data

US 2005/0200976 A1 Sep. 15, 2005

(30) Foreign Application Priority Data

Jun. 14, 2002 (DE) .............................. 102 26 471

(51) Int. Cl.
*G02B 13/20* (2006.01)
*G02B 3/02* (2006.01)
(52) U.S. Cl. ................. 359/707; 359/642; 359/718
(58) Field of Classification Search ................ 359/642, 359/718; 362/538
See application file for complete search history.

(56) References Cited

U.S. PATENT DOCUMENTS

| 1,370,885 | A | 3/1921 | Frederick et al. |
| 4,796,171 | A | 1/1989 | Lindae et al. |
| 5,014,173 | A | 5/1991 | Lindae et al. |
| 6,130,777 | A | 10/2000 | Yamashita et al. |
| 6,352,359 | B1* | 3/2002 | Shie et al. .................. 362/522 |
| 2001/0033726 | A1* | 10/2001 | Shie et al. .................. 385/133 |
| 2002/0141006 | A1* | 10/2002 | Pocius et al. ................. 359/15 |
| 2004/0032667 | A1* | 2/2004 | Gale et al. .................. 359/642 |

FOREIGN PATENT DOCUMENTS

| DE | 1 099 964 | 8/1961 |
| DE | 36 02 262 A1 | 5/1987 |
| DE | 40 31 352 A1 | 4/1992 |
| JP | 9-159810 A | 6/1997 |
| JP | 10-123307 A | 5/1998 |

OTHER PUBLICATIONS

Patent Abstract of Japan JP 01147403, Jun. 9, 1989.
Patent Abstract of Japan JP 03122902, May 24, 1991.

* cited by examiner

*Primary Examiner*—Jordan M. Schwartz
(74) *Attorney, Agent, or Firm*—Michael J. Striker

(57) ABSTRACT

The optical lens, especially for a motor vehicle, is provided with a soft-focus effect, e.g. to soften a light-dark boundary on an illuminated surface. For this purpose the optical lens has an optically active surface (5') provided with an embossed fine structure (2) extending radially outward in a direction from an optical axis (O) toward an outer periphery (P) in an undulating form and an embossed microstructure (3) superimposed on the embossed fine structure (2). The fine structure (2) has a roughness that is greater than that of the microstructure (3). The fine structure (2) preferably has a roughness of from 1 μm to 10 μm and the microstructure (3) has a roughness (h) in a range of from 0.1 μm to 2.5 μm.

9 Claims, 2 Drawing Sheets

OPTICAL LENS SOFT-FOCUS EFFECT

BACKGROUND OF THE INVENTION

The invention relates to an optical-projection lens. Such a lens has the function primarily of projecting an object from the object plane into an image plane. In many cases, the projections and the object should be similar to one another. Examples of such a lens in the automotive industry are the well-known projection lenses. However, the invention is expressly not limited to them.

In the use of such an optical lens, preferably an aspherical optical lens, unwanted effects can occur which can be ascribed to the intrinsically wanted sharp projection contours. An example that can be named is the boundary between light and dark in low-beam headlights of a motor vehicle. The sharp boundary between light and dark means that some regions of the road are illuminated only in some segments. However, providing that the adjoining regions also be illuminated is not only desirable, but within limits is also required by law.

SUMMARY OF THE INVENTION

Against this background, it is the object of the present invention to provide an optical lens with a soft-focus effect, which has a fine structure on its optically active surface, which makes it possible for the contours of an object projected through the lens not to be sharply focused, but rather to generate a soft transition.

Accordingly, an optical lens with an embossed fine structure extending in undulating form on its optically active surface is provided with a microstructure extending in undulating form, which is embossed onto the fine structure. Thus the surface of the lens is to a certain extent shaped such that two structures extending in undulating form are superimposed on one another; the microstructure modulates the fine structure, to use the terms known from other fields of technology. By means of this optical lens, a sharp boundary between light and dark regions illuminated by a light source is softened to provide a soft transition between light and dark. The sharpness or softness of the transition can be changed and adjusted in a targeted way by means of the proposed structures.

The structures may be provided on one or both sides of the lens.

The roughness of the fine structure will generally be greater than that of the microstructure. An especially favorable range for the roughness of the fine structure is in the range from 1–10 μm.

For the roughness of the microstructure, conversely, a range from 0.1–2.5 μm is preferred. Both structures are made permanently in the material of the lens. Especially preferably, the structures are provided on the aspherical side of the lens, if the lens is embodied as such.

An embodiment is especially preferred in which the fine structure extends radially outward, beginning at the optical axis of the lens. This is especially preferred whenever rotational symmetry, in the case of the projecting lens, is considered important.

An embodiment in which the microstructure superimposed on the fine structure is disposed concentrically about the optical axis of the lens is also especially preferred.

However, it is emphasized that it is also possible, for instance in condensor lenses for the use in BEAMER® headlights and projectors, for the structures also to be made axially parallel to one of the two main axes of the lens. In the final analysis, the desired field of use of the lens requires suitable modifications.

For special fields of use, such as automotive, it may be provided that the fine structure and the microstructure are embossed in a surface region extending concentrically about the axis of the lens. In a preferred embodiment, this surface region may be concentric to the optical axis on the aspherical side of the lens. In that case, the region of the lens located inside the ring will not participate in the soft-focus effect. This is not a problem, however, since particularly in motor vehicle lenses, this region has little optical significance.

In an especially preferred refinement, it is provided that the roughness of the fine structure decreases from the optical axis of the lens to its periphery; that is, its fluctuation is to a certain extent damped. As a result, less light scattering occurs in the outer region, which makes it possible to adhere to legally prescribed limits on brightness, for instance in the automotive field.

This can also be employed in surface regions that are only annular and are provided with the structures of the invention, in such a way that the roughness of the fine structure of the region oriented toward the optical axis of the lens decreases toward the region oriented toward the periphery of the lens.

BRIEF DESCRIPTION OF THE DRAWING.

The invention will be described in further detail in terms of examples in conjunction with the drawing. Shown are.

DESCRIPTION OF THE PREFERRED EMBODIMENTS.

Figure 1:
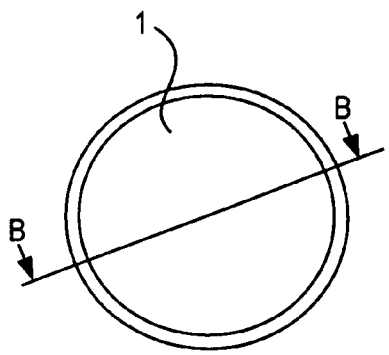
FIG. 1, the schematic plan view on a lens.
Figure 2:
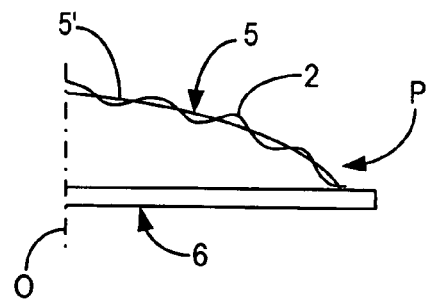
FIG. 2, one-half of a sagittal sectional view taken along the line B—B in FIG. 1.

FIG. 1 schematically shows a plan view on an aspherical lens 1. FIG. 2 schematically shows a sagittal section taken along the line B—B in FIG. 1. The fine structure 2 on the aspherical side 5 of the lens 1 can be seen clearly, while conversely the plane side 6 is not finely structured. For reasons of simplicity, the aspherical side 5 here is represented by a solid line, as is the course of the fine structure 2. The course shown for the aspherical side 5 would be the ideal course of the aspherical side, but in this case, the fine structure 2 extending radially outward from the optical axis of the lens is superimposed on it.

Figure 3:
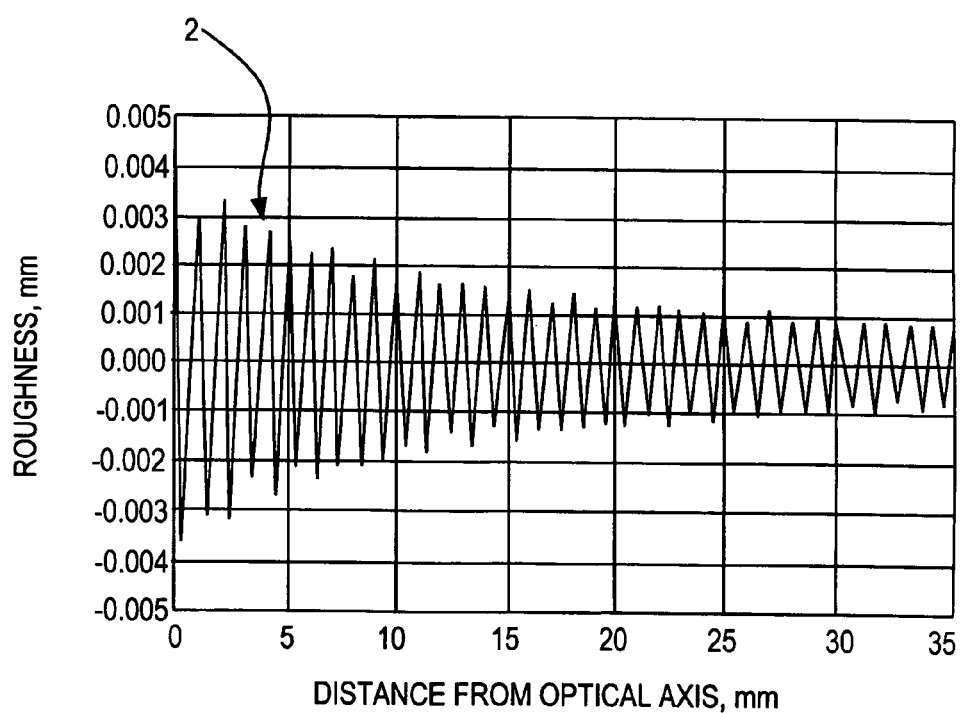
FIG. 3, the damped modulation of the fine structure on the lens.

The fine structure 2 on the optically active surface 5' of the lens 1 may—as shown in FIG. 3—be embodied such that the undulating course is damped toward the outer periphery P; that is, the roughness decreases from the optical axis O of the lens toward the outer periphery P of the lens. This is shown in FIG. 3. In it, from the "zero position" of the optical axis O, the distance is shown in millimeters on the abscissa and the roughness is shown in millimeters on the ordinate. As can be seen, the roughness in the region of the optical axis O amounts to approximately 3 µm, while at the periphery P of the lens it is approximately 1 µm. This fluctuation is damped so as to minimize scattered light effects at the outer edge of the lens. The amplitude of the fluctuation here is approximately 1 mm, for example.

Figure 4:
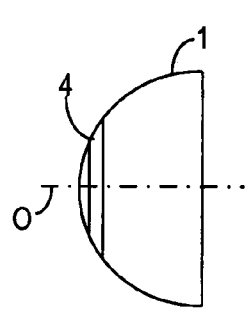
FIG. 4, the side view of an aspherical lens with a structured portion.
Figure 5:
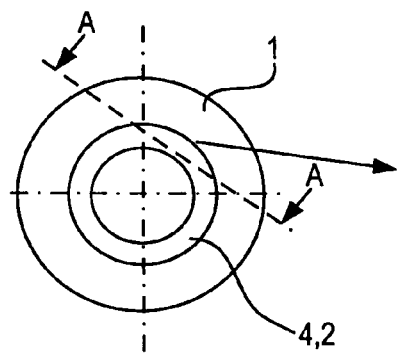
FIG. 5, the plan view on the lens of FIG. 4.
Figure 6:
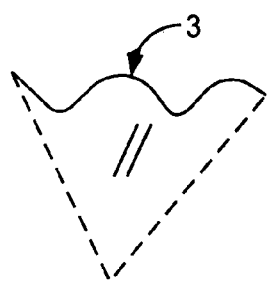
FIG. 6, schematically, a sectional view taken along the line A—A in FIG. 5.

FIG. 4 in a schematic side view shows another embodiment of an aspherical lens 1, from which an annular surface region 4, visible in a projection in the direction of the optical axis O (FIG. 5), is provided that carries the surface structures of the invention. This structure is shown clearly in FIGS. 5–7. FIG. 5 shows the plan view on the lens 1 of FIG. 4. FIG. 6 is a schematic sectional view taken along the line A—A in FIG. 5. A further structure can be seen in the annular surface region 4 as shown in FIGS. 6 and 7, namely the microstructure 3, which is superimposed on fine structure 2 according to FIG. 2 and FIG. 3.

Figure 7:
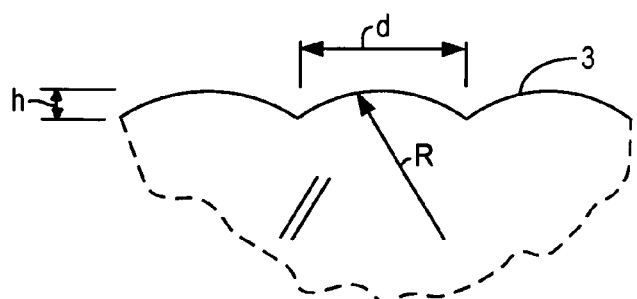
FIG. 7, schematically, the adjustable parameters of the microstructure superimposed on the fine structure.

In FIG. 7, the parameters that can be replicably produced for the microstructure 3 superimposed on the fine structure 2 can be seen. The fluctuation amplitude d is one adjustable parameter. For d, 0.2–0.5 mm is indicated as an especially preferred range.

The roughness h of the microstructure is preferably between 0.5 and 2.5 µm. The radius R, finally, is preferably 2–10 mm.

Depending on the intended field of use, a suitable embodiment of the fine structure 2 and the microstructure 3 will be employed.

Figure 8A:
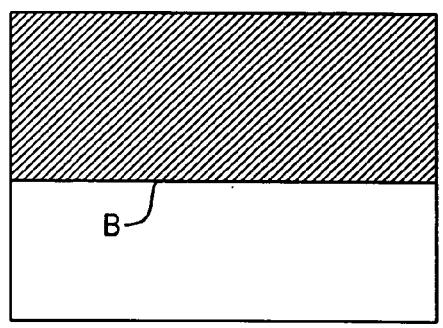
FIG. 8, schematically, the sharp projection contours (a) without a structure according to the invention, and the soft-focus effect (b), which brings about a softer transition from the boundary between light and dark.
Figure 8A:
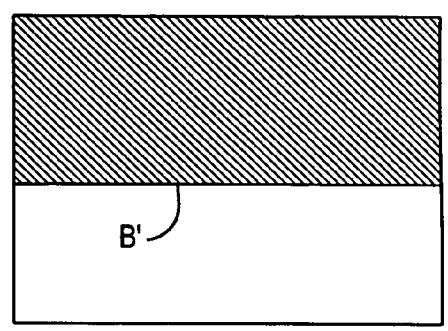

The effects attained with the lens with a soft-focus effect are seen by comparing FIG. 8*a* with FIG. 8*b*. FIG. 8*a* shows a sharp projection contour of a boundary B between light and dark. This is unwanted for use as a lens in a low-beam headlight in the automotive field, for instance. The lens according to the invention in a sense veils the transition, as can be seen from FIG. 8*b*. The previously sharp projection contour becomes softer, which in the case of a low-beam light means that the regions around the projection boundary B' are illuminated substantially more softly.

The invention claimed is:

1. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, said optically active surface (5') is provided with an embossed microstructure (3) superimposed on the embossed fine structure (2), the fine structure (2) has a roughness that is greater than that of the microstructure (3), and the microstructure (3) has a roughness (h) in a range of from 0.1 µm to 2.5 µm so as to modulate the fine structure thus providing a soft-focus effect.

2. The optical lens as defined in claim 1, wherein the fine structure (2) has a roughness in a range of from 1 µm to 10 µm.

3. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, and the microstructure (3) has a roughness (h) in a range of from 0.1 µm to 2.5 µm.

4. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, the microstructure (3) has a roughness (h) in a range of from 0.1 µm to 2.5 µm, and the microstructure (3) is arranged concentrically about said optical axis (O) of the lens (1).

5. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, the microstructure (3) has a roughness (h) in a range of from 0.1 µm to 2.5 µm, and the embossed fine structure (2) and the embossed microstructure (3) are provided in a surface region (4) extending concentrically about the optical axis (O).

6. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, the microstructure (3) has a roughness (h) in a range of from 0.1 µm to 2.5 µm, the embossed fine structure (2) and the embossed microstructure (3) are provided in a surface region (4) extending concentrically about the optical axis (O), and the surface region (4) is on an aspherical side (5) of the lens (1).

7. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, and said roughness of the embossed fine structure (2) decreases in said direction from said optical axis (O) of the lens toward said outer periphery (P).

8. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 µm to 10 µm, and said roughness of the fine structure (2) of a region oriented toward the optical axis (O) decreases toward another region oriented toward the outer periphery (P).

9. An optical lens (1) having an optically active surface (5') and an optical axis (O), wherein said optically active surface is provided with an embossed fine structure (2), said fine structure (2) extends radially outward in a direction from said optical axis toward an outer periphery (P), said fine structure (2) has an undulating form, an embossed microstructure (3) is provided on the embossed fine structure (2), the fine structure (2) has a roughness in a range of from 1 μm to 10 μm, the embossed fine structure (2) and the embossed microstructure (3) are provided only in a ring shaped pattern in a surface region (4) extending concentrically about the optical axis (O), and the surface region (4) is on an aspherical side (5) of the lens (1).

* * * * *